(12) United States Patent
Hirano et al.

(10) Patent No.: US 11,293,775 B2
(45) Date of Patent: Apr. 5, 2022

(54) MAP IMAGE DISPLAY DEVICE AND COMPUTER PROGRAM

(71) Applicant: TOYOTA JIDOSHA KABUSHIKI KAISHA, Toyota (JP)

(72) Inventors: Toshiyuki Hirano, Anjo (JP); Kazuya Ueda, Anjo (JP); Xin Jin, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 16/699,868

(22) Filed: Dec. 2, 2019

(65) Prior Publication Data
US 2020/0182644 A1 Jun. 11, 2020

(30) Foreign Application Priority Data
Dec. 5, 2018 (JP) .............................. JP2018-228328

(51) Int. Cl.
*G01C 21/36* (2006.01)
*G08G 1/0969* (2006.01)

(52) U.S. Cl.
CPC ....... *G01C 21/367* (2013.01); *G01C 21/3635* (2013.01); *G01C 21/3673* (2013.01); *G08G 1/0969* (2013.01)

(58) Field of Classification Search
CPC .............. G01C 21/367; G01C 21/3635; G01C 21/3673; G01C 21/3667; G08G 1/0969
See application file for complete search history.

(56) References Cited

U.S. PATENT DOCUMENTS

| 5,917,436 A * | 6/1999 | Endo ...................... G09B 29/10 340/995.14 |
| 2010/0241975 A1* | 9/2010 | Kinugawa ............ G09B 29/106 715/764 |
| 2015/0088415 A1* | 3/2015 | Kato ................... G01C 21/3673 701/454 |
| 2015/0187337 A1* | 7/2015 | Baxter .................. G06F 3/0481 345/660 |
| 2016/0273934 A1* | 9/2016 | Seko .................. G01C 21/3682 |

FOREIGN PATENT DOCUMENTS

JP  9-230785 A  9/1997

* cited by examiner

*Primary Examiner* — Khoi H Tran
*Assistant Examiner* — Shahzab Hussain Shah
(74) *Attorney, Agent, or Firm* — Oblon, McClelland, Maier & Neustadt, L.L.P.

(57) ABSTRACT

A map image and a character string indicating information relating to a spot included on the map image are displayed on a liquid crystal display, in a case where determination is made that a plurality of character strings displayed on the map image overlaps one another with displacement of a display range of the map image, at least one character string is set to non-display to restrain the character strings from overlapping one another, and thereafter, in a case where a state in which the character strings do not overlap one another is returned, and a predetermined time has elapsed or the map image has been rotationally moved at a predetermined angle or more after the character string is set to non-display, the character string is displayed again.

7 Claims, 5 Drawing Sheets

FIG. 3
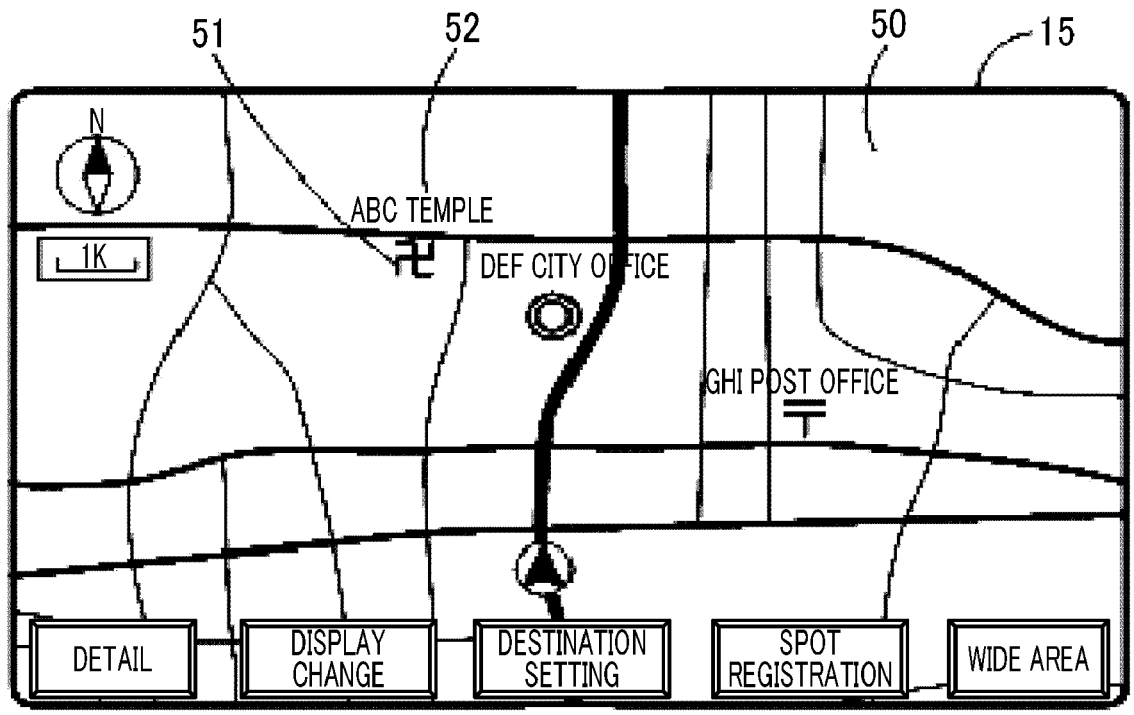
FIG. 4
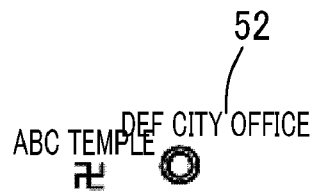
FIG. 5
| GENRE | PRIORITY |
|---|---|
| EATING AND DRINKING FACILITY<br>REFUELING FACILITY<br>PUBLIC FACILITY<br>AMUSEMENT FACILITY<br>⋮ | HIGH<br>⇅<br>LOW |

MAP IMAGE DISPLAY DEVICE AND COMPUTER PROGRAM

INCORPORATION BY REFERENCE

The disclosure of Japanese Patent Application No. 2018-228328 filed on Dec. 5, 2018 including the specification, drawings and abstract is incorporated herein by reference in its entirety.

BACKGROUND

1. Technical Field

The present disclosure relates to a map image display device and a computer program that display a map image.

2. Description of Related Art

In recent years, a navigation device that performs traveling guidance of a vehicle and enables a drier to easily arrive at a desired destination is often mounted in the vehicle. Here, the navigation device is a device that can detect a current position of a host vehicle by a GPS receiver or the like, can acquire map data corresponding to the current position through a recording medium, such as a DVD-ROM or an HDD, or a network, and can display the acquired map data on a display. Recently, among a mobile phone, a smartphone, a tablet terminal, a personal computer, and the like, devices having the same functions as the navigation device are known.

In the above-described navigation device and the like, as information relating to a spot included on a map image displayed on a display, a character string indicating a name or a genre of the spot is displayed around the spot on the map image, thereby providing a user with information around the current position of the vehicle. However, in a case where a large number of character strings are displayed on the map image, the character strings may be displayed to overlap each other, and there is a problem in that information cannot be appropriately provided to the user. Accordingly, Japanese Unexamined Patent Application Publication No. 9-230785 (JP 9-230785 A) has suggested a technique that erases a character string with low priority in a case where character strings displayed on a map image overlap each other.

SUMMARY

Here, in a case where a map around the current position of the vehicle is displayed, the map image generally displays a current direction of the vehicle fixedly on a screen (heading-up). In this case, in a case where the direction of the vehicle is changed, the displayed map image is rotated with the change in the direction of the vehicle. Accordingly, in a case where the vehicle travels on a road on which the vehicle alternately repeats right and left turns, such as a mountain road, the displayed map image repeats right and left rotations little by little with the change in the direction of the vehicle. As a result, a state in which the character strings displayed on the map image overlap each other and a state in which the character strings do not overlap each other may be repeated at a short interval.

In the technique described in JP 9-230785 A, in such a case, the character string is repeatedly erased and displayed, and there is a problem in that the visibility of the map image is significantly degraded.

The disclosure has been accomplished in order to solve the problem in the related art, and an object of the disclosure is to provide a map image display device and a computer program that restrain a display aspect of a character string from being frequently switched and restrain degradation of visibility of a map image in a case where a state in which character strings displayed on the map image overlap each other and a state in which the character strings do not overlap each other are repeated at a short interval.

A first aspect of the disclosure relates to a map image display. The map image display device includes a map image display unit, a display range displacement unit, a display change unit, and a display return unit. The map image display unit is configured to display a map image on a display and display a character string indicating information relating to a spot included on the map image around the spot. The display range displacement unit is configured to displace a display range of the map image displayed on the display. The display change unit is configured to, in a case where determination is made that a plurality of character strings displayed on the map image overlaps one another with the displacement of the display range by the display range displacement unit, change a display aspect of at least one character string from a first aspect to a second aspect to restrain the character strings from overlapping one another. The display return unit is configured to return the display aspect of the character string to the first aspect in a case where a state in which the character strings do not overlap one another is returned even though the character string is displayed in the first aspect after the display aspect of the character string is changed to the second aspect, and a predetermined time or more has elapsed or the map image has been rotationally moved at a predetermined angle or more after the display aspect of the character string is changed to the second aspect.

A second aspect of the disclosure relates to a computer program. The computer program is a program that displays a map image on a display. Specifically, the computer program causes a computer to function as a map image display unit configured to display a map image on a display and display a character string indicating information relating to a spot included on the map image around the spot, a display range displacement unit configured to displace a display range of the map image displayed on the display, a display change unit configured to, in a case where determination is made that a plurality of character strings displayed on the map image overlaps one another with the displacement of the display range by the display range displacement unit, change a display aspect of at least one character string from a first aspect to a second aspect to restrain the character strings from overlapping one another, and a display return unit configured to return the display aspect of the character string to the first aspect in a case where a state in which the character strings do not overlap one another is returned even though the character string is displayed in the first aspect after the display aspect of the character string is changed to the second aspect, and a predetermined time or more has elapsed or the map image has been rotationally moved at a predetermined angle or more after the display aspect of the character string is changed to the second aspect.

With the map image display device and the computer program according to the disclosure having the above-described configuration, display control is performed such that the display aspect of the character string is not frequently switched in a case where a state in which character strings displayed on the map image overlap each other and a state in which the character strings do not overlap each other are repeated at a short interval. Therefore, it is possible to appropriately guide information relating to a spot on the map image, and to restrain degradation of the visibility of the map image.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram showing a map image displayed on a liquid crystal display and character strings displayed on the map image;

FIG. 4 is a diagram showing an example where character strings displayed on the map image overlap each other;

FIG. 5 is a diagram showing a setting example of priority of a genre of a spot;

DETAILED DESCRIPTION OF EMBODIMENTS

Figure 1:
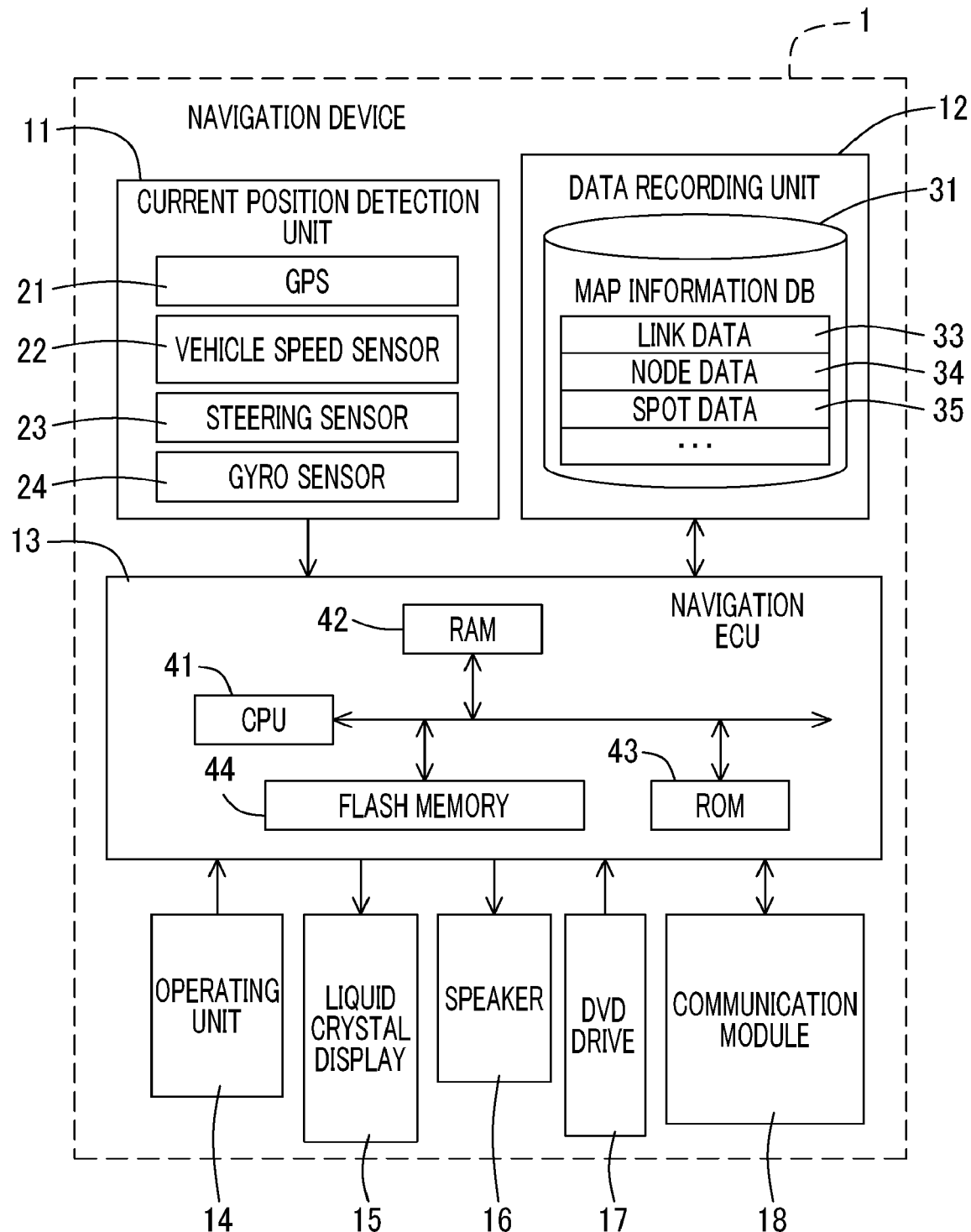
FIG. 1 is a block diagram showing a navigation device according to an embodiment.

Hereinafter, an embodiment in which a map image display device according to the disclosure is embodied in a navigation device will be described in detail referring to the drawings. First, the schematic configuration of a navigation device 1 according to the embodiment will be described referring to FIG. 1. FIG. 1 is a block diagram showing the navigation device 1 according to the embodiment.

As shown in FIG. 1, the navigation device 1 according to the embodiment has a current position detection unit 11 that detects a current position of a vehicle mounted with the navigation device 1, a data recording unit 12 in which various kinds of data are recorded, a navigation ECU 13 that performs various arithmetic operations based on input information, an operating unit 14 that receives an operation from the user, a liquid crystal display 15 that displays a map image around the vehicle or information relating to a spot on the map image to the user, a speaker 16 that outputs voice guidance relating to route guidance, a DVD drive 17 that reads a DVD as a storage medium, and a communication module 18 that performs communication with an information center, such as a probe center or a vehicle information and communication system (VICS: Registered Trademark) center.

Hereinafter, the components of the navigation device 1 will be described in order. The current position detection unit 11 has, a GPS 21, a vehicle speed sensor 22, a steering sensor 23, a gyro sensor 24, and the like, and is configured to detect a current position and a direction of the vehicle, a traveling speed of the vehicle, a current time, and the like. Here, in particular, the vehicle speed sensor 22 is a sensor that detects a moving distance or a vehicle speed of the vehicle, generates pulses with the rotation of the drive wheels of the vehicle, and outputs a pulse signal to the navigation ECU 13. Then, the navigation ECU 13 counts the generated pulses to calculate a rotation speed or moving distance of the drive wheels. The navigation device 1 does not need include all of the four sensors, and a configuration may be made in which the navigation device 1 includes solely one or a plurality of sensors.

The data recording unit 12 includes a hard disk (not shown) as an external storage device and a recording medium, and a recording head (not shown) as a driver that reads map information DB 31, a predetermined program, or the like recorded in the hard disk and writes predetermined data to the hard disk. The data recording unit 12 may be constituted of a memory card or an optical disc, such as a CD or a DVD, instead of the hard disk. A configuration may be made in which the map information DB 31 is stored in an external server, and the navigation device 1 acquires the map information DB 31 through communication.

Here, the map information DB 31 is, for example, a storage unit that stores link data 33 relating to roads (links), node data 34 relating to node points, spot data 35 relating to spots, such as facilities, map display data for displaying a map, intersection data relating to intersections, search data for searching for a route, search data for searching for spots, and the like.

As the link data 33, the following data is recorded. In terms of each link forming a road, data representing a width, gradient, cant, bank, state of a road surface of a road, to which the link belongs, the number of lanes of the road, a point where the number of lanes decreases, a point where the width becomes narrower, a railroad crossing, and the like, is recorded. In terms of a corner, data representing a radius of curvature, an intersection, a T-junction, an entrance and an exit of the corner, and the like is recorded. In terms of a road attribute, data representing a downhill road, an uphill road, and the like is recorded. In terms of a road type, data representing a toll road, such as a national expressway, a general toll road, and a toll bridge, a national expressway, an urban expressway, a superhighway, in addition to a general road, such as a national highway, a prefectural road, and a narrow street, is recorded.

As the node data 34, data relating to the coordinates (positions) of actual road junctions (including intersections, T-junctions, or the like) or node points that are set at predetermined distance on each road according to the radius of curvature or the like, a node attribute representing whether a node is a node corresponding to an intersection, a connected link number list that is a list of link numbers of links connected to a node, an adjacent node number list that is a list of node numbers of nodes adjacent to a node through a link, a height (altitude) of each node point, and the like is recorded.

As the spot data 35, information relating to spots, such as a departure place, a destination, and a guidance target in the navigation device 1, is stored. For example, information relating to facilities including accommodation facilities, such as hotels and inns, refueling facilities, such as gas stations, commercial facilities, such as shopping malls, supermarkets, shopping centers, and convenience stores, amusement facilities, such as theme parks and game centers, eating and drinking facilities, such as restaurants, bars, and pubs, parking facilities, such as public parking spaces, traffic facilities, religious facilities, such as temples and churches, public facilities, such as galleries and museums, corresponds to the spot data 35. Information relating to spots to be displayed on the map image, such as place names and intersection names, other than the facilities is included in the spot data 35.

Information that is stored as the spot data 35 includes detailed information, such as a name, position coordinates, genre (solely for facilities), business hours, and the like of each spot. Then, as described below, a spot name, a mark indicating a genre, or the like is displayed around a point corresponding to the position coordinates of each spot stored as the spot data 35 on the map image displayed on the liquid crystal display 15 as spot information of the spot.

The navigation electronic control unit (ECU) 13 is an electronic control unit that performs overall control of the navigation device 1, a CPU 41 as an arithmetic unit and a control device, and an internal storage device, such as a RAM 42 that is used as a work memory in a case where the CPU 41 executes various kinds of arithmetic processing and stores route data or the like in a case where a route is searched, a ROM 43 in which, in addition to a control program, a map image display processing program (FIG. 2) described below or the like is recorded, and a flash memory 44 that stores the program read from the ROM 43. The navigation ECU 13 has various units as a processing algorithm. For example, the map image display unit displays a map image on the liquid crystal display 15 and displays a character string relating to a spot included on the map image around the spot. A display range displacement unit displaces a display range of the map image displayed on the liquid crystal display 15. A display change unit changes a display aspect of at least one character string from a first aspect to a second aspect in a case where determination is made that a plurality of character strings displayed on the map image overlaps one another with the displacement of the display range by the display range displacement unit, thereby restraining the character strings from overlapping one another. A display return unit returns the display aspect of the character string to the first aspect in a case where a state in which the character strings do not overlap one another is returned even though the character string is displayed in the first aspect after the display aspect of the character string is changed to the second aspect, and a predetermined time or more elapses or the map image is rotationally moved at a predetermined angle or more after the display aspect of the character string is changed to the second aspect.

An operating unit 14 is operated in inputting a departure place as a traveling start point and a destination as a traveling end point, or the like, and has a plurality of operation switches (not shown), such as various keys and buttons. Then, the navigation ECU 13 performs control in order to perform various corresponding operations based on switch signals output with depression of the switches, or the like. The operating unit 14 may be constituted of a touch panel provided on a front surface of the liquid crystal display 15. Alternatively, the operating unit 14 may be constituted of a microphone and a voice recognition device.

On the liquid crystal display 15, a map image including roads, traffic information, operation guidance, an operation menu, key guidance, a guidance route from a departure place to a destination, guidance information along the guidance route, news, weather forecast, time, mail, television programs, and the like are displayed. In particular, in displaying the map image, a character string or a mark indicating a name or a genre of a spot is also displayed as information relating to the spot included on the map image around the spot. Instead of the liquid crystal display 15, an HUD or an HMD may be used.

The speaker 16 outputs voice guidance of guiding traveling along the guidance route or guidance of the traffic information based on an instruction from the navigation ECU 13.

The DVD drive 17 is a drive that can read data recorded in the recording medium, such as a DVD or a CD. Then, reproduction of music or video, update of the map information DB 31, or the like is performed based on the read data. In place of the DVD drive 17, a card slot for reading and writing a memory card may be provided.

The communication module 18 is a communication device that receives traffic information including information, such as congestion information, regulation information, and traffic accident information, transmitted from a traffic information center, for example, a VICS center, a probe center, or the like. A mobile phone or a DCM corresponds to the communication module 18.

Figure 2:
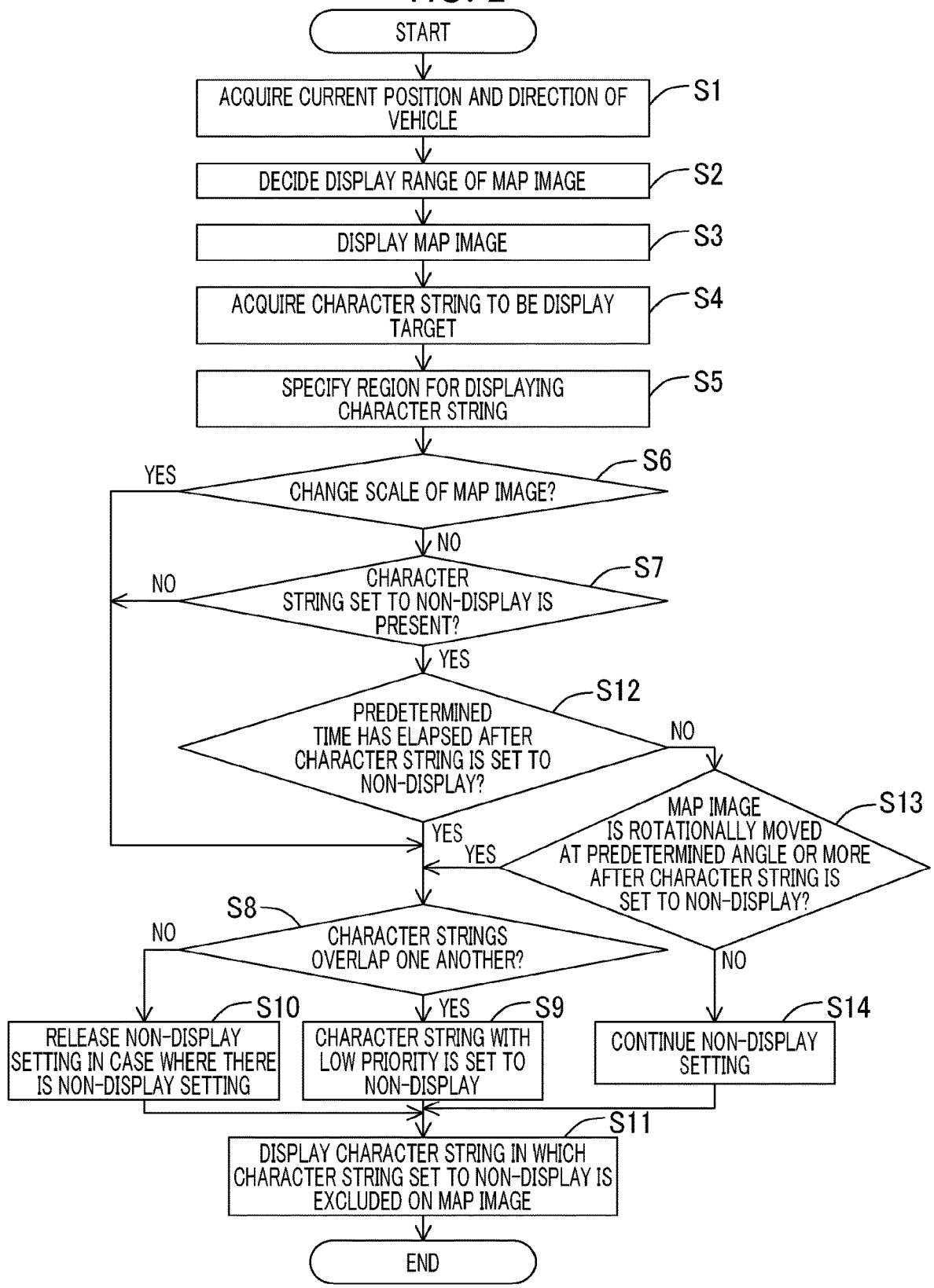
FIG. 2 is a flowchart of a map image display processing program according to the embodiment.

Subsequently, the map image display processing program that is executed by the navigation ECU 13 in the navigation device 1 having the above-described configuration will be described referring to FIG. 2. FIG. 2 is a flowchart of the map image display processing program according to the embodiment. Here, the map image display processing program is a program that is executed at a predetermined time interval (for example, 200 msec) after an ACC of the vehicle is turned on, and displays a map image around the current position of the vehicle along information relating to spots included on the map image. The program shown in the flowchart of FIG. 2 described below is stored in the RAM 42 or the ROM 43 of the navigation device 1 and is executed by the CPU 41.

First, in the map image display processing program, in Step (hereinafter, abbreviated as S) 1, the CPU 41 acquires the current position and direction of the vehicle based on a detection result of the current position detection unit 11. The CPU 41 also executes map matching processing for specifying the position of the vehicle on the map image.

Next, in S2, the CPU 41 decides a display range of the map image to be displayed on the liquid crystal display 15 based on the current position and direction of the vehicle and a current display scale of the map image. The display scale of the map image can be appropriately changed from a settable range (for example, 1/1250 to 1/20480000) based on a user's operation. In some areas, a detailed map image is not stored, and thus, the display scale of the map image may be automatically changed over areas. In the following description, an example where the map image is displayed in a heading-up system to fixedly display the current direction of the vehicle in the map image on a screen will be described.

Subsequently, in S3, the CPU 41 displays the map image of the display range decided in S2 described above on the liquid crystal display 15 on the currently set display scale. On the map image, the mark indicating the current position of the vehicle, the guidance route (solely in a case where the guidance route is set), and the traffic information, such as congestion or regulations, are appropriately displayed.

Thereafter, in S4, the CPU 41 acquires a character string (hereinafter, referred to as a display target character string) to be a display target to the map image displayed on the liquid crystal display 15. Here, it is assumed that the display target character string in the embodiment is a character string indicating information relating to a spot (hereinafter, referred to as a guidance target spot) to be a guidance target included on the map image, and more specifically, a name of a guidance target spot. A character string indicating a genre or other kinds of information (for example, business hours) other than the name may be included in the display target character string.

Accordingly, in S4 described above, the CPU 41 first extracts a guidance target spot included in the display range decided in S2 described above from the spot data 35. Thereafter, the name of the extracted guidance target spot is similarly acquired from the spot data 35. The acquired name of the guidance target spot becomes the display target character string. The display target character string may include information relating to an area, such as a name of a prefecture or names of a city, a ward, a town, and a village, in addition to the name of the guidance target spot.

Next, in S5, the CPU 41 specifies a region for displaying the display target character string acquired in S4 described above on the map image. In a case where a plurality of display target character strings is present, a region for displaying a display target character string is specified on the map image for each of the display target character strings. In the embodiment, a mark 51 (for example, a map symbol) indicating a genre of a guidance target spot is displayed in the position coordinates where the guidance target spot is present on a map image 50 displayed as shown in FIG. 3, and a display target character string 52 is displayed adjacent above the mark 51. Accordingly, an area where the display target character string 52 is displayed on the map image 50 is specified based on the position coordinates of the guidance target spot and the length (the number of characters) of the display target character string 52.

Subsequently, in S6, the CPU 41 determines whether or not the display range of the map image decided in S2 described above is changed with the change in the display scale of the map image. The greater the display scale of the map image, the narrower the display range, and the smaller the display scale of the map image, the wider the display range. The display scale of the map image is changed by a user's operation, and may be automatically changed over the areas.

Then, in a case where determination is made that the display scale of the map image is changed (S6: YES), the process progresses to S8. In contrast, in a case where determination is made that the display scale of the map image is not changed (S6: NO), the process progresses to S7.

In S7, the CPU 41 determines whether or not at least one or more character strings set to non-display are present among the display target character strings acquired in S4 described above. The non-display setting of the character string is performed in S9 described below, and the display target character string set to non-display is not displayed even though a corresponding spot is included in the display range of the map image.

Then, in a case where determination is made that a character string set to non-display is present (S7: YES), the process progresses to S12. In contrast, in a case where determination is made that the character string set to non-display is absent (S7: NO), the process progresses to S8.

In S8, in a case where a plurality of display target character strings is present, the CPU 41 compares the display regions of the display target character strings specified in S5 described above for each of the display target character strings and determines whether or not the display regions of the display target character strings overlap one another. Here, in a case where the display regions of the display target character strings overlap one another, as shown in FIG. 4, a plurality of display target character strings 52 may be displayed to overlap one another in a case where the display target character strings are displayed in the display regions specified in S5 described above. In a case where the display regions of the display target character strings do not overlap one another, the display target character strings may not overlap one another even though the display target character strings are displayed in the display regions specified in S5 described above.

Then, in a case where determination is made that the display regions of the display target character strings overlap one another (S8: YES), the process progresses to S9. In contrast, in a case where determination is made that the display regions of the display target character strings do not overlap one another (S8: NO), the process progresses to S10.

In S9, the CPU 41 sets the display target character strings other than the display target character string with the highest priority among the display target character strings, the display regions of which are determined to overlap one another, to non-display (that is, changes the display aspect from the first aspect to the second aspect). Here, the priority of each display target character string is set according to the genre of the guidance target spot or the position of the guidance target spot with information indicated by the display target character string.

As a method of setting priority according to the genre of the guidance target spot, as shown in FIG. 5, a priority order is set in advance for each genre of spots. Then, the priority order is compared for the genre of the guidance target spot with information indicated by the display target character string, and the display target character string corresponding to the genre with the highest priority order is set to the highest priority. As a method of setting priority of each genre, a genre of a spot that the user frequently stops by may be set to a higher priority order with reference to a traveling history of the user or may be set to a predefined fixed order.

As a method of setting priority according to the position of the guidance target spot, a display target character string indicating information of the guidance target spot closer to the current position of the vehicle is set to higher priority. The priority may be set based on the guidance route, the departure place, the destination, or the like, instead of the current position of the vehicle.

In S10, in a case where the display target character string previously set to non-display in S9 described above is present, the CPU 41 releases the non-display setting (that is, returns the display aspect from the second aspect to the first aspect).

Figure 6:
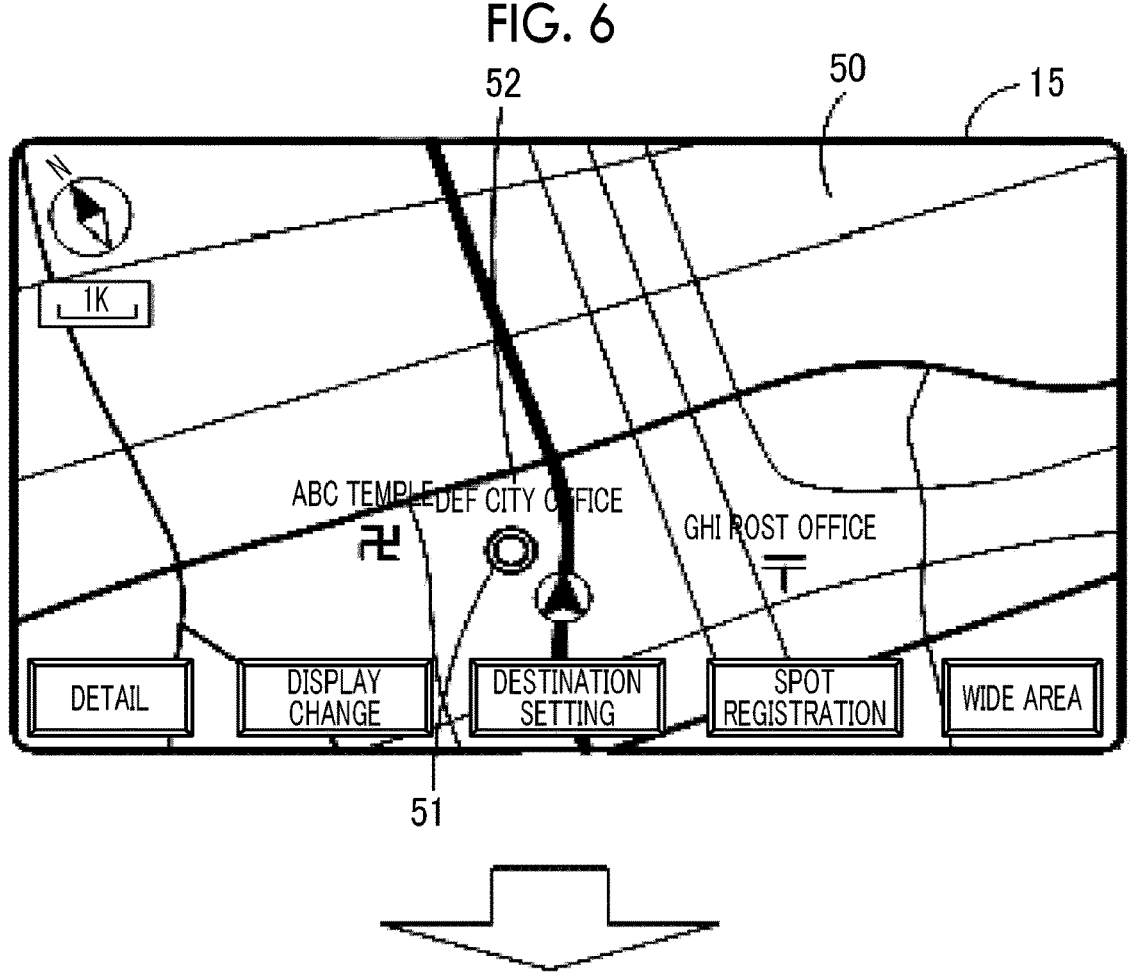
FIG. 6 is a diagram showing an example where a character string displayed on the map image is set to non-display.
Figure 6:
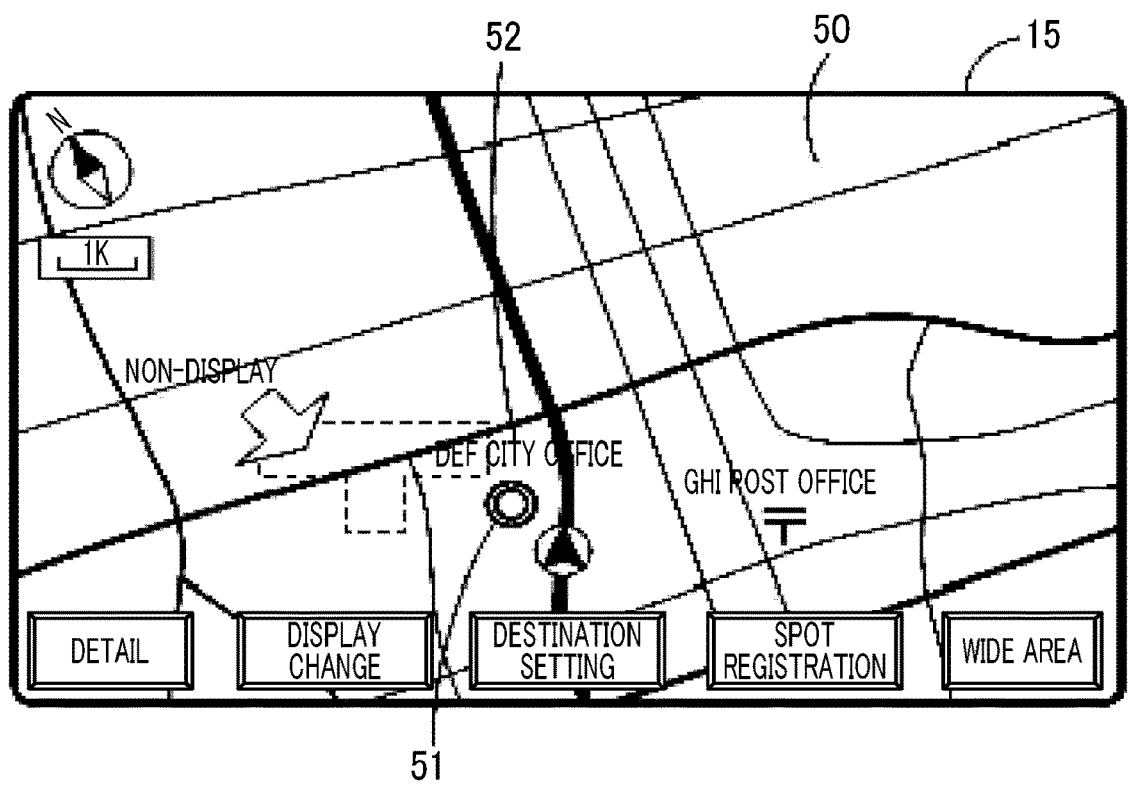

Next, in S11, the CPU 41 displays the display target character string acquired in S4 described above in the display region specified in S5 described above. Note that the display target character strings set to non-display in S9 described above are excluded. As a result, as in FIG. 6, the display range of the map image is displaced with the change of the current position or direction of the vehicle, and even though two display target character strings 52 of "ABC temple" and "DEF city office" are displayed to overlap each other, one display target character string 52 of "ABC temple" is not displayed, whereby it is possible to restrain the display target character strings 52 from being displayed to overlap each other. A timing at which the display target character string 52 of "ABC temple" is set to non-display may be immediately before the two display target character strings 52 of "ABC temple" and "DEF city office" overlap each other or may be a predetermined time before (for example, one sec before) a timing at which the display target character strings 52 of "ABC temple" and "DEF city office" are predicted to overlap each other in a case where a traveling route of the vehicle can be predicted. In an example shown in FIG. 6, although the mark 51 indicating the genre of the guidance target spot is set to non-display along with the display target character string 52, the display of the mark 51 may be continued.

In S12 that is executed in a case where determination is made in S7 described above that the display target character string set to non-display is present, determination is made whether or not a predetermined time (for example, three sec) or more elapses after the display target character string is set to non-display.

Then, in a case where determination is made that the predetermined time or more has elapsed after the display target character string is set to non-display (S12: YES), the process progresses to S8. In contrast, in a case where determination is made that the predetermined time or more has not elapsed after the display target character string is set to non-display (S12: NO), the process progresses to S13.

In S13, the CPU 41 determines whether or not the map image displayed on the liquid crystal display 15 is rotationally moved at a predetermined angle (for example, 45 degrees) or more after the display target character string is set to non-display.

Then, in a case where determination is made that the map image displayed on the liquid crystal display 15 is rotationally moved at the predetermined angle or more after the display target character string is set to non-display (S13: YES), the process progresses to S8. In contrast, in a case where determination is made that the map image displayed on the liquid crystal display 15 is not rotationally moved at the predetermined angle or more after the display target character string is set to non-display (S13: NO), the process progresses to S14.

In S14, the CPU 41 continues the non-display setting set to the display target character string. Thereafter, the process progresses to S11.

Figure 7:
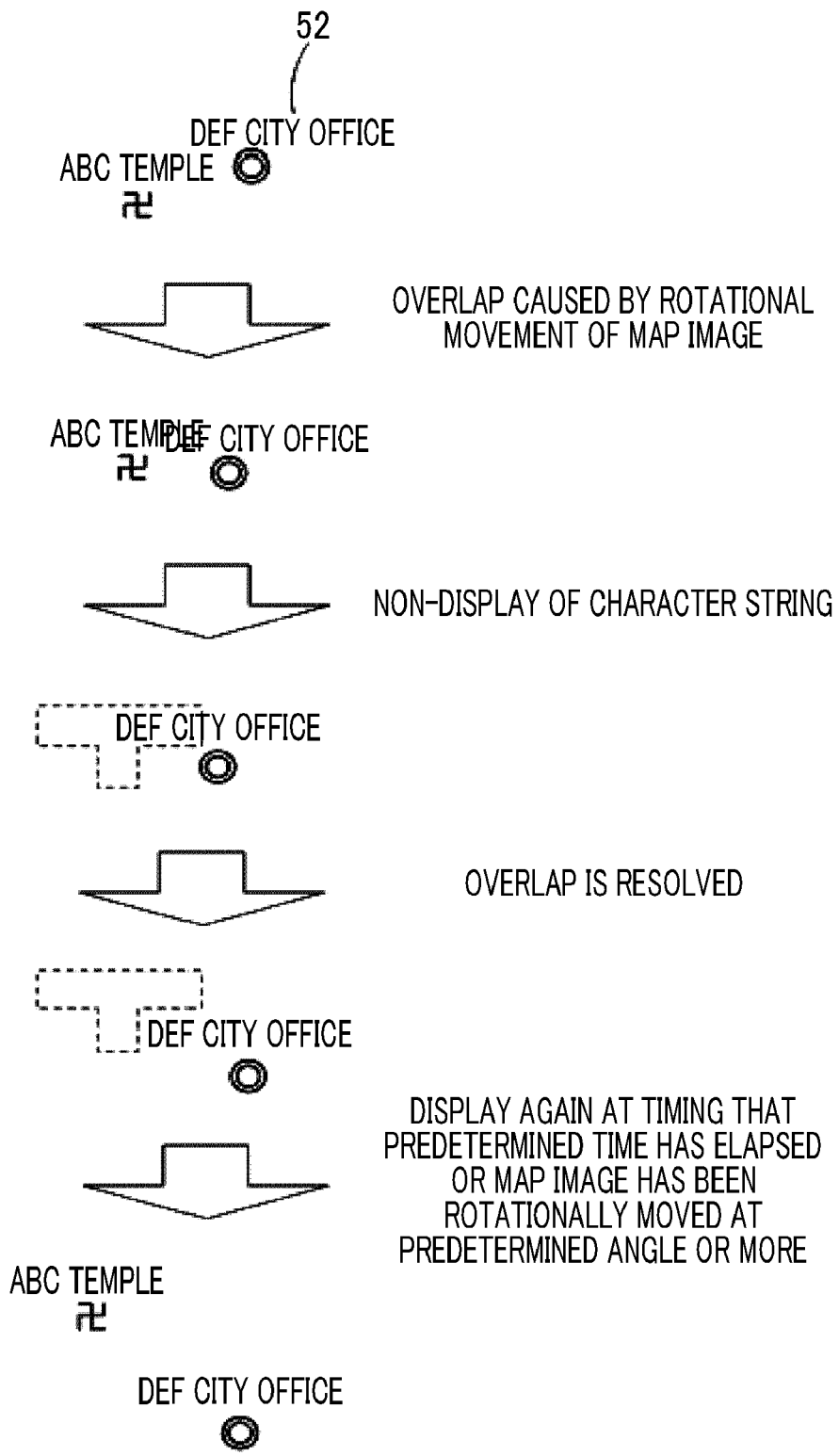
FIG. 7 is a diagram showing change of a display target of a character string displayed on the map image.

As a result of the processing of S12 to S14 described above, as shown in FIG. 7, after determination is made that the display target character strings overlap one another, and the display target character string is set to non-display once, even though the state in which the display target character strings do not overlap one another is returned, the display target character string is not displayed again unless either of the following condition (1) or (2) is satisfied. (1) The predetermined time or more has elapsed after the display target character string is set to non-display. (2) The map image displayed on the liquid crystal display 15 is rotationally moved at the predetermined angle or more after the display target character string is set to non-display.

The condition (1) is set, whereby even in a state in which the vehicle is traveling on a serpentine road on which the vehicle alternately turns right and left, and a state in which the display target character strings overlap one another and a state in which the display target character strings do not overlap one another are switched in a short time, it is possible to restrain the character string from being repeatedly erased and displayed in a short time.

The condition (2) indicates a situation in which the vehicle is traveling on a curve on which the vehicle turns largely in one direction, not on a serpentine road on which the vehicle alternately turns right and left. In such a situation, since the overlapping display target character strings are predicted to be significantly separated from each other at the end of the curve, the display target character strings do not instantly overlap each other again even though the vehicle starts to turn in an opposite direction after the end of the curve. Accordingly, the condition (2) is set, whereby it is possible to restrain the character string from being repeatedly erased and displayed in a short time.

Note that, exceptionally, in a case where the display range of the map image is displaced with the change of the display scale of the map image, and the state in which the display target character strings do not overlap one another is returned, the display target character string is displayed again even though the conditions (1) and (2) are not satisfied (S6: YES→S8: NO). This is because the switching of the display scale is not frequently and performed, and thus, the character string is estimated to be not repeatedly erased and displayed in a short time even though the character string is displayed again at the timing at which the state in which the display target character strings do not overlap one another is returned. The switching of the display scale of the map image is not generally performed during traveling of the vehicle, and thus, the influence on the user is small even though the visibility of the map image is temporarily degraded.

As described above in detail, in the navigation device 1 according to the embodiment and the computer program that is executed by the navigation device 1, the map image and the character strings indicating information relating to the spots included on the map image are displayed on the liquid crystal display 15. On the other hand, in a case where determination is made that the character strings displayed on the map image overlap one another with the displacement of the display range of the map image, at least one character string is set to non-display to restrain the character strings from overlapping one another (S9). Thereafter, in a case where the state in which the character strings do not overlap one another is returned, and the predetermined time or more has elapsed or the map image has been rotationally moved at the predetermined angle or more after the character string is set to non-display, the character string is displayed again (S10). Thus, in a case where the state in which character strings displayed on the map image overlap each other and the state in which the character strings do not overlap each other are repeated at a short interval, display control is performed such that the display aspect of the character string is not frequently switched. Therefore, it is possible to appropriately guide information relating to the spots on the map image, and to restrain degradation of the visibility of the map image.

The disclosure is not limited to the above-described embodiment, and various improvements and modifications can be of course made without departing from the spirit and scope of the disclosure. For example, in the embodiment, although the display aspect of the display target character string is switched from "display (first aspect)" to "non-display (second aspect)" to restrain the character strings from overlapping one another in a case where the display target character strings overlap one another, the display target character strings may be displayed in other aspects as long as it is possible to restrain the display target character strings from overlapping one another. For example, the second aspect may be "reduction of a character size", "semi-transmissive display of a character string, or "change of a display position of a character string". In a case where the two display target character strings overlap each other, the display aspect of both of the display target character strings may be changed, instead of changing the display aspect of solely one display target character string. Alternatively, solely the display aspect of a portion (in particular, a portion overlapping the other character string) of the character string, not the entire character string, may be changed to the second aspect, whereby it is possible to restrain the character strings from overlapping each other.

In the embodiment, although the character string indicating the name of the spot is displayed on the map image as information relating to the spot, a character string indicating other kinds of information (for example, the genre or detailed information of the spot) may be displayed.

In the embodiment, although a case where the display target character strings overlap one another with the change of the current position or direction of the vehicle or the change of the display scale of the map image has been described as an example, the disclosure can also be applied to a case where the display target character strings overlap one another with a user's scroll operation of the map image.

The disclosure can be applied to various devices that have a function of displaying the map image, other than the navigation device. For example, the disclosure can also be applied to a portable terminal, such as a mobile phone or a smartphone, a personal computer, a tablet terminal (hereinafter, referred to as a portable terminal), or the like. Then, the disclosure is applied to a case where a map image around a current position of a user or a map image of any area designated by the user is displayed, or the like, other than a case where the map image around the current position of the vehicle is displayed.

The disclosure can also be applied to a system that is constructed by the navigation device 1 and a server or a portable terminal and a server. In this case, a configuration may be made in which a part of the steps of the map image display processing program (FIG. 2) described above is executed by the server. For example, the processing other than S3 and S11 may be executed by the server.

Although the embodiment in which the map image display device and the computer program according to the disclosure are embodied has been described above, the map image display device may have the following configurations, and in this case, the following effects are provided.

For example, a first configuration is as follows. A map image display device includes a map image display unit (41) that displays a map image (50) on a display (15) and displays a character string (52) indicating information relating to a spot included on the map image around the spot, a display range displacement unit (41) that displaces a display range of the map image displayed on the display, a display change unit (41) that, in a case where determination is made that a plurality of character strings displayed on the map image overlaps one another with the displacement of the display range by the display range displacement unit, changes a display aspect of at least one character string from a first aspect to a second aspect to restrain the character strings from overlapping one another, and a display return unit (41) that returns the display aspect of the character string to the first aspect in a case where a predetermined time or more has elapsed or the map image has been rotationally moved at a predetermined angle or more after the display aspect of the character string is changed to the second aspect in a case where a state in which the character strings do not overlap one another is returned even though the character string is displayed in the first aspect after the display aspect of the character string is changed to the second aspect. With the map image display device having the above-described configuration, in a case where the state in which character strings displayed on the map image overlap each other and the state in which the character strings do not overlap each other are repeated at a short interval, display control is performed such that the display aspect of the character string is not frequently switched. Therefore, it is possible to appropriately guide information relating to a spot on the map image, and to restrain degradation of the visibility of the map image.

A second configuration is as follows. The display range displacement unit (41) changes a display scale of the map image (50) displayed on the display (15) to displace the display range of the map image displayed on the display, and the display return unit (41) returns the display aspect of the character string to the first aspect even though the predetermined time or more has not elapsed or the map image has not been rotationally moved at the predetermined angle or more after the display aspect of the character string is changed to the second aspect in a case where the state in which the character strings do not overlap one another is returned even though the character string is displayed in the first aspect with the change of the display scale of the map image displayed on the display after the display aspect of the character string (52) is changed to the second aspect. With the map image display device having the above-described configuration, exceptionally, in a case where transition is made from the state in which the character strings displayed on the map image overlap one another to the state in which the character strings do not overlap one another with the change of the display scale of the map image, the display aspect of the character string is returned to the first aspect at the timing. Accordingly, in a situation in which there is a low possibility that the state in which the character strings displayed on the map image overlap one another and the state in which the character strings do not overlap one another are repeated in a short time, it is possible to display the character string in the first aspect as much as possible.

A third configuration is as follows. The display change unit (41) sets at least a part of the character strings other than a predetermined character string the character strings (52) determined to overlap one another to non-display to restrain the character strings from overlapping one another. With the map image display device having the above-described configuration, in a case where the character strings displayed on the map image overlap one another, a part of the character strings is set to non-display, whereby it is possible to restrain the character strings from being displayed to overlap one another.

A fourth configuration is as follows. Each of the character strings (52) displayed on the map image (50) has priority set according to a genre or a position of a spot with information indicated by the character string, and the predetermined character string is a character string with the highest priority among the character strings determined to overlap one another. With the map image display device having the above-described configuration, in a case where the character strings displayed on the map image overlap one another, the character strings other than the character string with the highest priority are set to non-display, whereby it is possible to restrain the character strings from being displayed to overlap one another. The display of the character string with high priority is continued, whereby it is possible to continuously provide the user with information with high importance.

A fifth configuration is as follows. The map image display device further includes a vehicle position acquisition unit (41) that acquires a current position of a vehicle, the map image display unit (41) displays a map image (50) around the current position of the vehicle on the display (15), and the display range displacement unit (41) displaces the display range of the map image displayed on the display with change of the current position and direction of the vehicle. With the map image display device having the above-described configuration, in a case where the map image around the current position of the vehicle is displayed, and in a case where the state in which character strings displayed on the map image overlap each other and the state in which the character strings do not overlap each other are repeated at a short interval with the change of the current position or direction of the vehicle, display control is performed such that the display aspect of the character string is not frequently switched. Therefore, it is possible to appropriately guide information relating to a spot on the map image, and to restrain degradation of the visibility of the map image.

What is claimed is:

1. A map image display device comprising:
 circuitry programmed to:
 control an electronic display to display a map image on the electronic display and display a character string indicating information relating to a spot included on the map image around the spot;
 displace a display range of the map image displayed on the electronic display;
 in a case where a determination is made that a plurality of character strings displayed on the map image overlaps one another with the displacement of the display range, change a display aspect of at least one of the character strings from a first aspect to a second aspect to restrain the character strings from overlapping one another; and
 return the display aspect of the at least one of the character strings from the second aspect to the first aspect in a case where:
  a state in which the character strings do not overlap one another is returned, and
   a predetermined time or more has elapsed after the display aspect of the at least one of the character strings is changed to the second aspect, or
   the map image has been rotationally moved at a predetermined angle or more after the display aspect of the at least one of the character strings is changed to the second aspect.

2. The map image display device according to claim 1, wherein the circuitry is programmed to:
 displace the display range of the map image with change of a display scale of the map image displayed on the electronic display; and
 return the display aspect of the at least one of the character strings from the second aspect to the first aspect, even though the predetermined time or more has not elapsed after the display aspect of the at least one of the character strings is changed to the second aspect or the map image has not been rotationally moved at the predetermined angle or more after the display aspect of the at least one of the character strings is changed to the second aspect, in a case where the state in which the character strings do not overlap one another is returned with the change of the display scale of the map image displayed on the electronic display after the display aspect of the at least one of the character strings is changed to the second aspect.

3. The map image display device according to claim 1, wherein the circuitry is programmed to set at least a part of the character strings other than a predetermined character string among the character strings determined to overlap one another to non-display to restrain the character strings from overlapping one another.

4. The map image display device according to claim 3, wherein:
 each of the character strings displayed on the map image has a priority set according to a genre or a position of a spot with information indicated by a respective character string; and
 the predetermined character string is a character string with the highest priority among the character strings determined to overlap one another.

5. The map image display device according to claim 1, wherein the circuitry is programmed to:
 acquire a current position of a vehicle;
 display the map image around the current position of the vehicle on the electronic display; and
 displace the display range of the map image displayed on the electronic display with the change of the current position and a direction of the vehicle.

6. The map image display device according to claim 1, wherein the circuitry is programmed to return the display aspect of the at least one of the character strings from the second aspect to the first aspect in a case where the state in which the character strings do not overlap one another is returned and the predetermined time or more has elapsed after the display aspect of the at least one of the character strings is changed to the second aspect.

7. A non-transitory computer readable medium storing a computer program that when executed by a computer causes the computer to perform a method comprising:
 controlling an electronic display to display a map image on the electronic display and display a character string indicating information relating to a spot included on the map image around the spot;
 displacing a display range of the map image displayed on the electronic display;
 in a case where a determination is made that a plurality of character strings displayed on the map image overlaps one another with the displacement of the display range, changing a display aspect of at least one of the character strings from a first aspect to a second aspect to restrain the character strings from overlapping one another; and
 returning the display aspect of the at least one of the character strings from the second aspect to the first aspect in a case where:
  a state in which the character strings do not overlap one another is returned, and
   a predetermined time or more has elapsed after the display aspect of the at least one of the character strings is changed to the second aspect, or
   the map image has been rotationally moved at a predetermined angle or more after the display aspect of the at least one of the character strings is changed to the second aspect.

* * * * *